May 7, 1940.  L. DEWAN  2,199,394
LIGHT CONTROL SYSTEM
Filed July 22, 1938  2 Sheets-Sheet 1
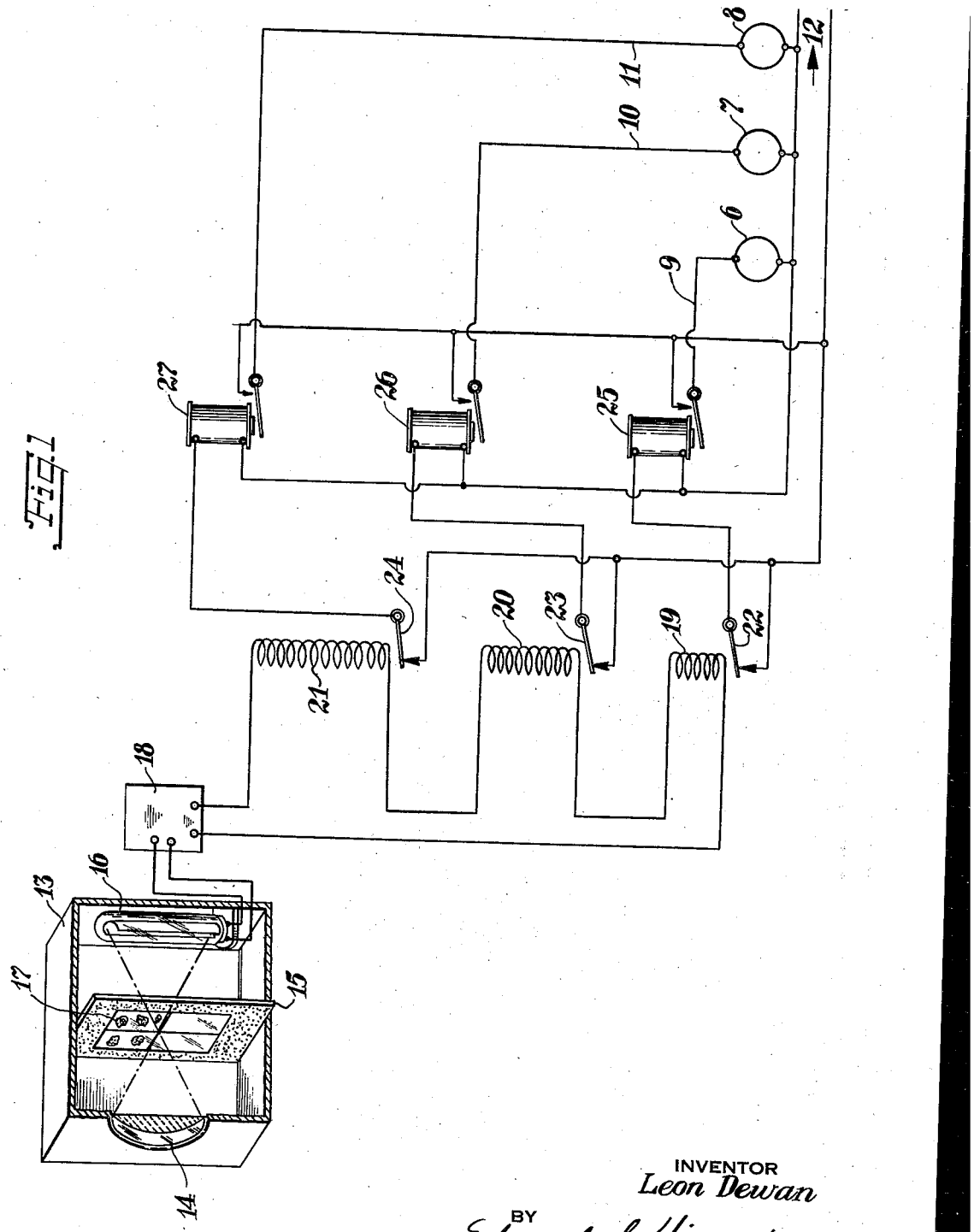
INVENTOR
Leon Dewan
BY
Edward S. Higgins
ATTORNEYS

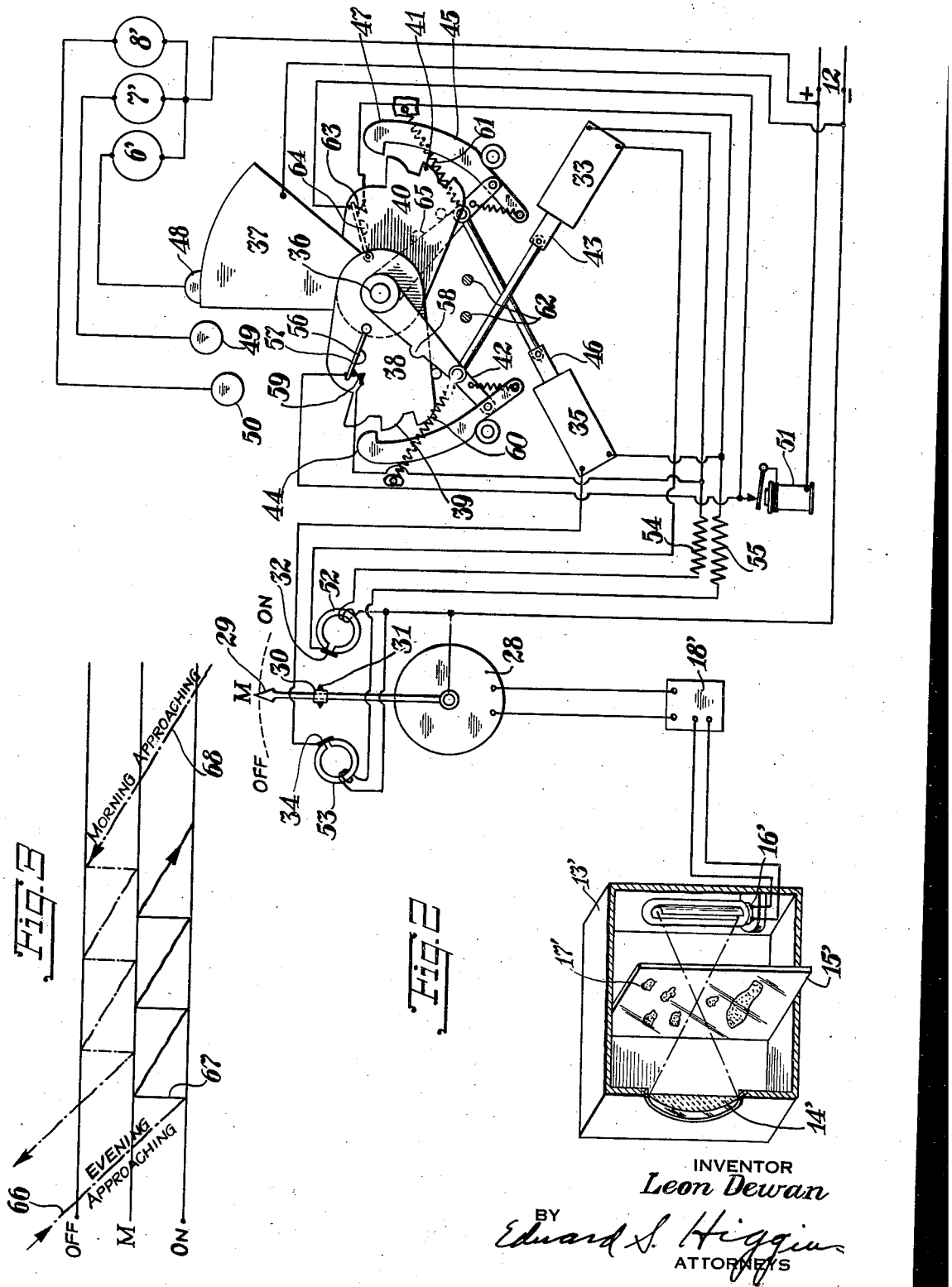

Patented May 7, 1940

2,199,394

UNITED STATES PATENT OFFICE 2,199,394

LIGHT CONTROL SYSTEM

Leon Dewan, New York, N. Y.

Application July 22, 1938, Serial No. 220,652

17 Claims. (Cl. 250—41.5)

This invention relates generally to light control systems and more particularly to light control systems for automatically controlling a plurality of lamps individually in a room or other enclosure and to apparatus therefor.

It has been proposed to control such indoor illumination by means of a system including a photo-sensitive device actuating a movable arm or switch element for controlling a plurality of lighting units individually. However the instantaneous position of such movable switch element has been dependent upon the instantaneous state of the illumination within the region and this is objectionable due to the fact that in such a system the switch element makes and breaks the lamp circuit gradually and slowly. Such slow movement of the movable switch element causes arcing, injuring the switch elements and is impracticable.

Furthermore such systems and the apparatus used are expensive and difficult to control and maintain.

It is an object of the present invention to overcome the foregoing objections and disadvantages.

Another object is to provide a system and apparatus for automatically maintaining a constant illumination in a room or other enclosure at a predetermined desired level irrespective of variations in the natural or daylight illumination.

A further object is to provide a system and apparatus for regulating indoor illumination in which a photo-sensitive device is used which is uninfluenced by either direct sun light or direct artificial light rays.

Another object is to provide a system including one photo-cell controlling a plurality of lighting units having individual circuits in which the lights are lit and turned off with a positive snap action.

A still further object is to provide such an apparatus that is inexpensive to manufacture and maintain.

The foregoing and other objects and advantages are accomplished in accordance with my improved system and apparatus by providing a photo-sensitive device, an image producing device, such as a lens, and a glass screen which is adapted to select certain portions of the light rays passing to and influencing the photo-sensitive device so that while said device is indirectly under the influence of the general light, yet direct sunlight or direct artificial light rays or any light rays of a much greater intensity than the average general illumination may be prevented from influencing such device. At certain predetermined degrees or values of density of such selected illumination, the energy of such photo-sensitive device actuates snap action switches consecutively whereby the lighting units are turned on or off with a positive action.

An important feature of my invention is that whereby the gradually changing energy of a photo-sensitive cell which controls a plurality of lamps individually will cause a switching means controlling these lamps to execute a series of consecutive snap action switch movements as the natural illumination gradually changes.

The foregoing objects and advantages and novel features of my invention will be best understood from the description thereof to follow taken in connection with the accompanying drawings in which—

Fig. 1 is a schematic view of a system and apparatus embodying one form of my invention.

Fig. 2 is a schematic view of a system and apparatus embodying another form of my invention.

Fig. 3 is a graph illustrating the action of the system and apparatus of Fig. 2.

Referring to Fig. 1, I have illustrated a plurality of lighting units, three being shown and indicated at 6, 7 and 8, connected in individual circuits 9, 10 and 11, respectively, which circuits are connected to the main or house supply line 12.

The lighting units are so disposed within the room or other enclosure as to provide the most efficient lighting therefor.

A camera box or casing 13 is mounted in the room to be illuminated, preferably at a point near the ceiling and facing the window. In this box is mounted a lens 14 which is so positioned that the image of the window and entire room and contents are focused fully upon a glass screen 15 which is positioned behind the lens. Light from this image passes through the glass screen and influences a photo-sensitive cell 16. The photosensitive cell 16 is electrically connected to and controls the output of an amplifier 18.

The camera is faced to image the window fully on the glass screen 15 and every part of the image except the window is blocked out so that only the natural or daylight illumination reaches the photocell 16. Furthermore even the reflections of the lamps in the glass of the window are blocked in the image on the screen 15 so that when they are lit in the evening they will not shine into the photocell.

This blocking off or selection may be accomplished by painting the glass screen with opaque paint at the points thereon where such sources are imaged on the screen, as indicated for example at 17, to render such points or portions non-responsive. Such blocking off may be accomplished in any other suitable manner.

In accordance with my invention, a gradual change of the natural illumination from daylight to darkness and back again causes a series of positive switchings of the lamp circuits. Only natural illumination is used in this form of my invention to the total exclusion of artificial light. The windings of the relays 19, 20, and 21, which are connected in the output circuit of the amplifier vary in the number of turns of their coil windings so that their strengths vary progressively. As the illumination on the photo-sensitive cell and the current output of the amplifier change, the relays pull over or release in sequence at predetermined illumination levels. For example, assuming that it is bright daylight, the amplifier current is strong, all the relays are holding their armatures and all the lamps are unlit. With the approach of darkness and the gradual weakening of the amplifier current, the relay 19, being the weakest, will be the first to release its armature 22 and cause lamp 6 to be lit. With increasing darkness relay 20 and then relay 21 will release armatures 23 and 24, respectively, and energize lamps 7 and 8, respectively, when it has become sufficiently dark outside.

With approaching morning and increase of natural illumination, the process is reversed and the relay 21, being the strongest, will be the first to pull over and extinguish lamp 8 while relay 20 and relay 19 will follow successively and extinguish lamps 7 and 6, respectively, as morning arrives.

Intermediate heavy contact relays 25, 26 and 27 controlled by relays 19, 20 and 21, respectively, are used to open and close the lamp circuits.

It is of great importance in this form of the invention that all direct or reflected light from the lamps in the room be excluded from the photo-cell and that only light passing into the room through the window be permitted to reach it. If light rays from lamps 6, 7 and 8 could reach the photocell 16 and affect it, there would be interference with the progressive switching because these rays would immediately reverse any of relays 19, 20 or 21 after an action. For example, if the natural illumination is decreasing and relay 19 releases its armature to switch off lamp 6, the direct rays from lamp 6, if they were allowed to reach the photocell, would immediately increase the amplifier current and cause relay 19 to pick up its armature and switch the light off again and from that time on, the relay would continuously switch the lamp 6 on and off again.

Another form of apparatus for carrying out my improved scheme is shown in Fig. 2 and this apparatus like that of Fig. 1 also produces a series of snap action switchings as the natural illumination gradually changes. However it differs from Fig. 1 in that it is operated by the average light in the room, that is, from any light, natural or artificial, or a combination of both. In this form of the invention, the camera 13' with its lens 14' may be positioned to image the interior walls of the room upon the screen 15' and the combined natural and artificial light reflected from them is allowed to pass to the photocell 16' while the image of the window and the lamps are blocked out with opaque paint or the like, as indicated at 17'.

The photocell 16' is electrically connected to and controls the output of an amplifier 18' which in turn is connected to an ammeter relay 28. This relay includes an oscillating needle 29 which supports a sleeve 30 of soft metal or steel formed with contact members 31 projecting from opposite sides of the sleeve. The needle 29 is connected to the negative side of the supply line 12. On one side of the needle 29 in the path of movement of the contact 31 is a contact member 32 connected to a solenoid 33, and on the opposite side in the path of movement of the contact 31 is another contact member 34 connected to a solenoid 35.

Fastened to a rock shaft 36 is a plate 37 and secured to the same shaft at one side of the plate 37 and close thereto is another plate 38 provided with peripheral teeth 39 and fastened on the same shaft on the other side of the plate 37 is a third plate 40 also provided with similar teeth 41.

Loosely mounted on the shaft 36 outside of but alongside of plate 38 and suitably insulated is a pawl member 42 which is connected to the core 43 of solenoid 33. The nose 44 of pawl 42 is positioned in alignment with the teeth 39 of plate 38. Another pawl member 45 is similarly loosely mounted on shaft 36 outside of but alongside of plate 40. This pawl 45 is connected to core 46 of solenoid 35, and has its nose 47 positioned in alignment with the teeth 41 of plate 40.

Positioned close to and in the path of movement of plate 37 are three arcuate spaced contacts 48, 49 and 50 connected in circuit with the lighting units 6', 7' and 8', respectively.

The solenoids 33 and 35 are connected to the positive side of the supply line 12 contacts 59 and 63, respectively, and through a relay device 51 which is of the delayed type. This relay will repeatedly break and make the circuit, it is connected in, when that circuit becomes energized, the action being similar to that of the ordinary electric bell or to a thermo-flasher. Plate 37 is connected to the negative side of the supply line.

Connected to the supply line are electro magnets 52 and 53, respectively, each having a nearly closed field. Coil 52 is connected with solenoid 33 and a resistance device 54 is interposed therebetween. The other coil 53 is connected to the solenoid 35 with a resistance device 55 therebetween. The values of resistances 54 and 55 are such that the current they pass is sufficient to magnetize 52 and 53, respectively, but is too low to operate the relay 51.

The operation of the apparatus shown in Fig. 2 is as follows:

Let us assume evening is approaching and it is getting dark. This change in natural illumination will influence the photocell 16' which through the amplifier 18' and relay 28 will cause the needle 29 to gradually move in accordance with the change in natural illumination toward contact 32. When it has moved so that the contact 31 is sufficiently close to contact 32, the electromagnet 52 will draw or attract said contact 31 and move it over to make a positive contact between contacts 31 and 32, and solenoid 33, being in circuit with contact 32, is energized drawing its core 43 inwardly to move the pawl 42, which in turn pulls on teeth 39 and moves the switch plate 38 counterclockwise as viewed in Fig. 2 one notch. Movement of the switch plate 38 also moves the switch plate 37 counterclockwise a similar distance so that it engages the first switch contact 48 thereby closing the circuit which includes lighting unit 6' which is thereby illuminated. Included in the same circuit with the solenoid 33 is the relay 51 which will within a certain time break the circuit and deenergize the solenoid 33 and the electromagnet 52. This deenergization of electromagnet 52 permits the needle 29 to swing back approximately to the center point marked "M" in Figure 2 awaiting further change of illumination to follow, the deenergization of solenoid 33 allowing pawl 42 to return to normal position. After a time, relay 51 will automatically return to a closed position but will not thereby energize solenoid 33 since contact between contacts 31 and 32 is now open.

Now assuming that it is getting still darker, the needle 29 will again move toward and into positive contact with contact 32 when the same circuit will again be closed and solenoid 33 will again be energized drawing its pawl 42 against the next tooth and moving plate 38 another notch in a counterclockwise direction, along with plate 37 which also moves counterclockwise until it engages contact 49 when the lighting unit 7' in circuit therewith is illuminated. A moment later the relay 51, which is also in circuit, will have broken the circuit which includes the electromagnet 52 thus permitting the needle 29 to swing back again to "M" position. Upon a further predetermined degree of darkness of the natural illumination being reached, the needle 29 will again move toward the contact 32 to again close the circuit when the same instrumentalities will function thereby again moving the switch plate 37 counterclockwise so that it engages switch contact 50 thereby closing the circuit to and including lighting unit 8' lighting the same. A moment later the relay 51 will have broken the circuit as previously described permitting needle 29 to swing to "M" position again.

When the plates 38 and 37 have moved to their farthest counterclockwise position, a lug 56 on a spring pressed switch arm 57 will have moved into contact with a projection 58 on the pawl 42 and the contact between the arm 57 and the contact 59 on the plate 38 is broken thereby breaking the circuit thus preventing the solenoid 33 from being energized by any possible further contact of member 31 with member 32.

When dawn arrives and it begins to get lighter outdoors, the needle 29 will be moved toward the left as viewed in Fig. 2 and when sufficiently close to contact 34 electromagnet 53 will quickly move said needle with its contact 31 into a positive connection or contact with contact 34 thereby closing the circuit to solenoid 35 which when energized will draw its core 46 inwardly moving pawl 45 whose nose 47 will engage a tooth 41 of plate 40 and move said plate 40 one notch in a clockwise direction as viewed in Fig. 2. Movement of plate 40 will move switch plate 37 one notch in the same direction thereby disconnecting it from contact 50 to disconnect lighting unit 8' and extinguish the same. Relay 51 which is also included in the same circuit with solenoid 35 will after a moment's interval open the circuit and deenergize said solenoid and the electromagnet 53 thereby permitting the needle 29 to swing toward the right to "M" position as viewed in Fig. 2. Upon a further change in illumination and at a predetermined degree of darkness, needle 29 will have again moved toward the left into positive contact with contact 34 which will cause pawl 45 to again move one notch clockwise to move plate 37 out of engagement with switch contact 49 thereby opening the circuit to lighting unit 7' and extinguishing the same. When the natural illumination reaches a greater degree of brightness, the needle 29 will again be moved into contact 34 to move plate 37 out of engagement with contact 48 to extinguish lighting unit 6'.

The pawls 42 and 45 are normally urged away from the pull of solenoids 33 and 35 by springs 60 and 61, respectively.

Stops 62 are provided to limit the stroke of the pawls 42 and 45.

The switch arm 63 and lugs 64 and 65 on plate 40 are similar to switch arm 57 and lugs 56 and 59 on plate 38 and will prevent energization of solenoid 35 after all the lamps have been disconnected.

Referring to the diagram illustrated in Fig. 3, the slanting portions of the solid line 66 represent the average general illumination in a room from break of day until night falls. The vertical portions 67 represent the periods of time when the switch acts to add a lamp or lighting unit. The level of illumination at which the switch acts to aid a lamp and which is marked "on" may be that level which is produced by the full artificial illumination in the room with no natural light added; in other words, full night time illumination. This may be represented as 100 light units for the sake of illustration. The broken line 68 represents the illumination of the room as night gives way to full daylight.

The switch acts to disconnect a lamp each time that the illumination reaches the "off" level. The needle 29 swings back to "M" position whenever released by the electro-magnets.

The swing of the needle 29 from the "off" or "on" level to "M" always represents an illumination change equal to that of one of the lamps controlled, and in a system with three lamps as herein illustrated, it represents approximately 33⅓ units or one-third of the artificial illumination controlled. If there were five lamps in the system instead of three and the "on" level is 100, the "M" level would be 120 units and the "off" level would be 140 units since each lamp would represent 20% of the controlled artificial illumination.

I claim:

1. In a method for individually controlling the illumination of a plurality of separate lighting units in a room or the like using a photosensitive device, the step of switching the lighting units on or off progressively with a snap action.

2. In a method for individually controlling the illumination of a plurality of separate lighting units in a room or the like using a photosensitive device, the steps of blocking off the direct light rays from the photosensitive device and switching the lighting units on or off progressively with a snap action.

3. Apparatus for controlling the illumination in a room or the like including a photosensitive device having an output circuit, a plurality of lamps, switching means operated from the output circuit including a plurality of contacts for said lamps, and means for moving said switching means intermittently in response to gradual illumination change.

4. An apparatus for controlling the illumination in a room or the like, including a photosensitive device, switching means controlled by said photosensitive device for individually controlling a plurality of lamps, a source of power for said lamps, and means whereby the switching means progressively connects the lamps with a snap action switching of each lamp to the source of power as the natural illumination decreases.

5. A system for maintaining the intensity of illumination substantially constant in a room or the like in accordance with the changes in daylight illumination comprising a plurality of lamps, a plurality of circuits for said lamps, a source of electromotive power for energizing said lamps, switching means for progressively and additively connecting the separate lamp circuits to said source of power, said switching means including a plurality of relay devices, each relay device controlling a lamp circuit, a photo-sensitive device, a second set of relay devices controlled by said photo-sensitive device, the second named relay devices being connected in the output circuit of the photo-sensitive device and each being of different strength so as to act separately at intervals in response to gradual change in the strength of the output circuit, and an operative connection between said lamp circuit controlling relay devices and said second named relay devices including contacts on the second named relay devices, each contact being constantly connected to the operating coil of the lamp circuit controlling relay devices and to the side of the power circuit opposite to that to which its respective coil is connected for controlling the actuation of the armatures of the lamp circuit controlling relay devices and holding all of said armatures in closed circuit position whereby said lamps are progressively and additively connected to the source of power with decrease of daylight illumination until all of said lamps are illuminated and whereby said lamps are progressively disconnected from the source of power with the increase of daylight illumination until all of said lamps are extinguished.

6. A system for maintaining the intensity of illumination substantially constant in a room or the like comprising a plurality of individual lamps, a source of electric motive power for energizing said lamps, switching means for connecting the separate lamps to said source of power at time intervals, said switching means including a separate relay device connected to each lamp, a photosensitive device, and a set of relay devices each having windings of different and progressive potential strength controlled by said photosensitive device, one of said latter relay devices being operatively connected to one of the first named relay devices for controlling the actuation of the armature of said first named relay device whereby said lamps are progressively and additively connected to the source of power and a device for forming an image, selecting and rejecting portions of said image and impressing the selected portions of the image upon the photosensitive device.

7. A system for maintaining the intensity of illumination substantially constant in a room or the like comprising a plurality of lamps, a source of power for energizing said lamps, a multi-position switch for connecting all or a portion of said lamps in circuit with said source of power, a light sensitive device and means controlled by said light sensitive device for moving said multi-position switch with a snap action toward the position in which all or any of said lamps are connected in circuit with said source of power.

8. A system for maintaining the intensity of illumination constant in a room or the like comprising a plurality of lamps, a source of power for energizing said lamps, a multi-position switch for connecting all or a portion of said lamps in circuit with said source of power, a light sensitive device, means controlled by said light sensitive device for moving said multi-position switch with a snap acton toward the position in which all of said lamps are connected in circuit with said source of power and means controlled by said light sensitive device for moving said multi- position switch with a snap action toward the position in which none of said lamps are connected in circuit, said switch moving means including an ammeter relay connected to said light sensitive device, an electromagnet connected to said ammeter relay, a pawl operatively connected to the armature of said electromagnet, stationary switch contacts and a switch contact movable by said pawl over the stationary contacts.

9. A system for maintaining the intensity of illumination substantially constant in a room or the like comprising a plurality of lamps, a source of power for energizing said lamps, a multi-position switch for connecting all or a portion of said lamps in circuit with said source of power, a light sensitive device, and means controlled by said light sensitive device for moving said multi-position switch with a snap action toward the position in which all of said lamps are connected in circuit with said source of power.

10. A system for maintaining the intensity of illumination substantially constant in a room or the like comprising a plurality of lamps, a source of power for energizing said lamps, a multi-position switch for connecting all or a portion of said lamps in circuit with said source of power, a light sensitive device, means controlled by said light sensitive device for moving said multi-position switch with a snap action toward the position in which all of said lamps are connected in circuit with said source of power, means controlled by said light sensitive device for moving said multi-position switch with a snap action toward the position in which none of said lamps are connected in circuit, said switch moving means including an ammeter relay connected to said light sensitive device, a solenoid connected to said ammeter relay, a pawl operatively connected to the armature of said solenoid, stationary switch contacts and a switch contact movable by said pawl over the stationary contacts and a member for screening the light rays passing to said light sensitive device.

11. In an illumination control system, in combination, a plurality of lighting circuits, lamps in said circuits, a quick acting switch for controlling said circuits, a light sensitive device controlling the action of said switch, a source of light for energizing said light sensitive device and a translucent plate between said source of light and the light sensitive device, said plate being opaque at the points on its surface struck by direct rays of light.

12. In combination with a plurality of separate light sources for illuminating a room or the like, a source of energy for said light sources, switch means for controlling said light sources including a separate stationary contact connected to each light source, a movable contact adapted to connect all said contacts to said source of energy, a solenoid arranged when energized to move quickly said movable contact into contact successively with the stationary contacts, a second solenoid arranged when energized to move said movable contact successively out of contact with said stationary contacts, a photosensitive device responsive to the illumination of said room and an ammeter relay controlled by said photo sensitive device to energize either of said solenoids.

13. In combination with a plurality of separate light sources for illuminating a room or the like, a source of energy for said light sources, switch means for controlling said light sources including a separate stationary contact connected to each light source, a movable contact adapted to connect all said contacts to said source of energy, a solenoid arranged when energized to move quickly said movable contact into contact successively with the stationary contacts, a second solenoid arranged when energized to move said movable contact successively out of contact with said stationary contacts, a photosensitive device responsive to the illumination of said room, an ammeter relay controlled by said photosensitive device to energize either of said solenoids and a member for screening the light rays passing to said photosensitive device whereby direct rays from light sources are prevented from passing to the photosensitive device.

14. In an apparatus for individually controlling a plurality of lamps in a room or the like, a photosensitive device, an ammeter relay controlled thereby including a needle, a contact to one side of the needle for causing a lamp to switch off, a contact to the other side of the needle for causing a lamp to switch on, said needle being adapted to swing only part of the way toward the opposite contact upon switching of a lamp and means whereby a plurality of successive movements of the needle to the closed circuit position will cause a plurality of lamps to be switched on progressively.

15. In an apparatus for controlling the illumination of a room or the like, a lamp, an image forming means, means for selecting portions of said image and rejecting others and a photosensitive device receiving and being influenced by the selected portions of the image for controlling the illumination of the lamp.

16. The method of controlling the illumination in a room consisting of focussing an image, selecting portions of the image and rejecting others and impressing the selected portions of the image upon a photosensitive device to control the illumination of a lamp in the room.

17. The method of controlling the illumination in a room or the like consisting of focussing an image of the room in a plane, selecting a portion of the image in the plane, transmitting the selected portion of the image to a photosensitive device and controlling the illuminating units in the room by means of said photo sensitive device.

LEON DEWAN.